(12) United States Patent
Parkinson et al.

(10) Patent No.: US 8,834,716 B2
(45) Date of Patent: Sep. 16, 2014

(54) WATER TREATMENT DEVICE

(75) Inventors: David J. Parkinson, Clevedon (GB); James E. Delves, Bristol (GB); Kam L. Wong, Bristol (GB)

(73) Assignee: Aquacyc Limited, Central, Hong Kong (CN)

( * ) Notice: Subject to any disclaimer, the term of this patent is extended or adjusted under 35 U.S.C. 154(b) by 541 days.

(21) Appl. No.: 13/263,058

(22) PCT Filed: Apr. 7, 2010

(86) PCT No.: PCT/GB2010/050601
§ 371 (c)(1),
(2), (4) Date: Dec. 22, 2011

(87) PCT Pub. No.: WO2010/116186
PCT Pub. Date: Oct. 14, 2010

(65) Prior Publication Data
US 2012/0091050 A1    Apr. 19, 2012

(30) Foreign Application Priority Data

Apr. 9, 2009    (GB) .................................. 0906335.5

(51) Int. Cl.
| | |
|---|---|
| *C02F 1/32* | (2006.01) |
| *C02F 1/40* | (2006.01) |
| *C02F 1/42* | (2006.01) |
| *B01D 24/10* | (2006.01) |
| *B01D 24/38* | (2006.01) |
| *C02F 1/38* | (2006.01) |
| *C02F 1/00* | (2006.01) |
| *C02F 103/00* | (2006.01) |
| *C02F 1/76* | (2006.01) |

(52) U.S. Cl.
CPC ................ *C02F 1/38* (2013.01); *C02F 2303/12* (2013.01); *C02F 1/32* (2013.01); *C02F 2209/40* (2013.01); *C02F 2103/002* (2013.01); *C02F 2209/42* (2013.01); *C02F 1/004* (2013.01); *C02F 1/76* (2013.01)
USPC ........... 210/196; 210/202; 210/205; 210/209; 210/289; 210/512.1

(58) Field of Classification Search
CPC ............ C02F 1/001; C02F 1/004; C02F 1/32; C02F 1/38; C02F 1/40; C02F 1/42; C02F 1/06; C02F 1/76; C02F 1/08; C02F 2103/002; C02F 2303/12; B01D 24/12; B01D 24/38
USPC .............. 210/196, 198.1, 202, 205, 209, 269, 210/281, 289, 512.1
See application file for complete search history.

(56) References Cited

U.S. PATENT DOCUMENTS

| | | | |
|---|---|---|---|
| 3,054,602 | A | 9/1962 | Produman |
| 5,108,655 | A | 4/1992 | Johns, Jr. et al. |
| 2003/0178359 | A1 | 9/2003 | Posselt |
| 2007/0084802 | A1 | 4/2007 | Hilgren et al. |

FOREIGN PATENT DOCUMENTS

| | | |
|---|---|---|
| CN | 101352629 A | 1/2009 |
| EP | 1475354 A1 | 11/2004 |
| WO | WO-9415157 A1 | 7/1994 |

OTHER PUBLICATIONS

Water Reclamation Standard; Laboratory testing of systems using grey water; BSRIA Technical Note TN Jul. 2002.
Chinese Office Action for Application No. 201080015353.9, dated Nov. 21, 2013 with its English translation thereof.
International Search Report for Application PCT/GB2010/050601 dated Oct. 28, 2010.
Database WPI Week 200925 Thomson Scientific, London, GB (English Translation Abstract/Claims of CN101352629), 2009.
U.K. Examination Report for Application GB0906335.5 dated Aug. 28, 2009.
Australian Examination Report for Application No. 2010233503 dated Feb. 11, 2014.

*Primary Examiner* — Lucas Stelling

(74) *Attorney, Agent, or Firm* — Honigman Miller Schwartz and Cohn LLP

(57) ABSTRACT

A water treatment system, for example for treating grey water from domestic appliances comprises a water treatment device containing a filter media through which the water passes to remove particulates and bio-matter. The device has a lid provided with a spraying device. The spraying device may, for example, receive treated water along a line, possibly with the addition of an anti-foaming agent. Operating of the spraying device thus serves to collapse any foam generated within the water treatment device. Filter media can be cleaned periodically in a cyclone, after being drawn up through a pipe by means of a jet pump, receiving treated water along a line. Treated water is stored in a storage tank for subsequent use.

13 Claims, 11 Drawing Sheets

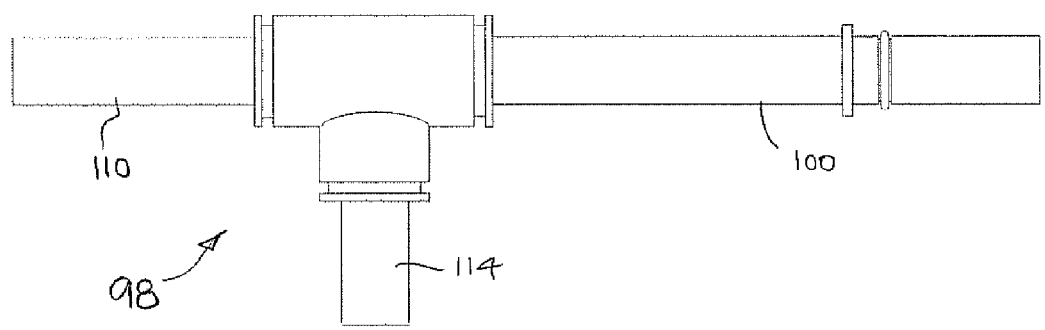
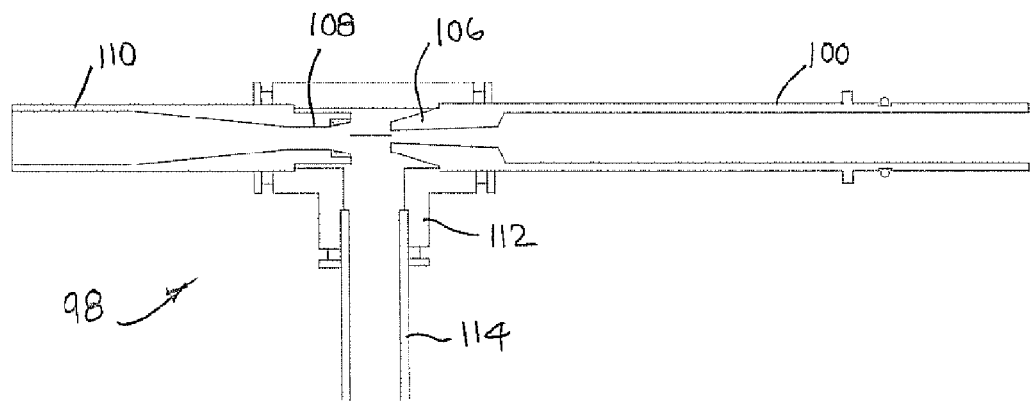
Fig 5

WATER TREATMENT DEVICE

FIELD OF INVENTION

This invention relates to a water treatment device, and to a water treatment system including the device, for the treatment of water for domestic and industrial uses. The invention is concerned particularly, although not exclusively, with a water treatment device used for the treatment of grey water (wholesome or potable water that has been used for bathing, washing or laundry use), of rain water (for example surface run off water from roofs) or any form of precipitation, or of water from other sources of non-wholesome water such as boreholes.

There is currently, and will continue to be, an increasing demand for potable water throughout the world. This is largely as the result of continued population increases and the demands of emerging nations for immediate western style living standards.

The result is that the demand for water is increasing at a greater rate than the sources of water supply available. The knock-on effect of this is that the infrastructures originally built to supply water cannot now cope with the additional demand. Also, the existing foul drainage and effluent treatment plants are unable to cope with the increased, predominantly water based, load.

Tertiary treatment of potable water and recycling of water such as grey water or rain water is therefore becoming extremely important.

The main applications for a compact water treatment system include:
(1) Treatment of grey water from baths, showers, basins and possibly washing machines to allow the treated water to be used for flushing toilets and urinals, trickle and drip fed irrigation systems and water for car washing.
(2) Treatment of run off precipitation from roofs or permeable paving systems.
(3) Tertiary polishing of potable water at point of use, to include domestic and commercial property, to allow the mains feed water to be treated in order to remove suspended and dissolved compounds which may be in the distribution pipe supply line, in addition to killing, rendering harmless or removing harmful bacteria.

DESCRIPTION OF THE BACKGROUND

WO9415157 discloses a water treatment system in which the water to be recycled is fed to a first stage separator in the form of a settling chamber, in which solids particles settle out. Periodically, a fluidising device is operated to discharge these particles to a drain.

The water, from which the solids particles have settled out, overflows to a tank and is then pumped through a liquid/liquid hydrocyclone to carry out a secondary treatment stage which removes contaminants that are lighter than water through the hydrocyclone overflow. The treated water is discharged through the hydrocyclone underflow and pumped to a high level treated water storage tank. The tank may be connected to a dedicated pipe system to distribute the water, by gravity, to WC cisterns or urinals.

In the water treatment system of WO9416157 the water to be treated has to pass through two different stages. As a result, the system is complicated to construct and has numerous parts, making it difficult to manufacture and install, whilst also producing doubtful water quality. This leads to high build and installation costs, making it unsuitable for the average consumer market.

CN101352629 discloses a water treatment device comprising a filter chamber with an internal filter body. Water enters the filter chamber tangentially and circulates around an annulus formed by the chamber and the filter body, allowing heavy large particles to drop out under gravity. A large proportion of water flows radially into the filter body to be filtered by filter media. The filtered water is transferred to a storage tank for later use.

Grey water typically contains contaminants such as soap, shampoo and detergents. Thus, for example, a synthetic grey water designated "Class 1 Basic Grey Water" is defined as follows:

The recipe to formulate 100 liters of "Class 1 Basic Grey Water" is as follows:
- 97.5 liters of tap water at 30° C.
- 86 ml shampoo and/or liquid soap.
- 1 ml sunflower oil.
- 2.5 liters tertiary treated sewage effluent with >$10^6$ cfu/100 ml total coliforms.

(Source: Building Services Research and Information Association (BSRIA) *Water Reclamation Standard for Laboratory testing of systems using grey water*, Technical note TN July 2002, by Reginald Brown and Anu Palmer.)

The microbiological Water Quality to be achieved by treatment processes for water to be made available for WC flushing is:
- Total coliforms<100 cfu/100 ml.
- Samples shall be visually clear and free from floating particles and sediment
- The Opacity of any reclaimed water shall not exceed 60% when measured at 254 nm.
- Dissolved oxygen shall not fall below the lesser of 10% saturation or 1 mg/liter.
- Total Chlorine less than 2 ppm or equivalent The microbiological Water Quality to be achieved by treatment processes for water to be made available for Drip and trickle irrigation is:
- Total coliforms<1000 cfu/100 ml.
- Samples shall be visually clear and free from floating particles and sediment
- The Opacity of any reclaimed water shall not exceed 60% when measured at 254 nm.
- Dissolved oxygen shall not fall below the lesser of 10% saturation or 1 mg/liter.
- Total Chlorine less than 0.5 ppm or equivalent The microbiological Water Quality to be achieved by treatment processes for water to be made available for vehicle washing is:
- Total coliforms<10 cfu/100 ml.
- Samples shall be visually clear and free from floating particles and sediment
- The Opacity of any reclaimed water shall not exceed 60% when measured at 254 nm.
- Dissolved oxygen shall not fall below the lesser of 10% saturation or 1 mg/liter.
- Total Chlorine less than 0.5 ppm or equivalent The water treatment system described in CN101352629 suffers from the following problems:
1. The liquid soap used in the BSRIA synthetic grey water recipe causes foaming of the water entering the filter body. The media bed is then blinded by the foam, which is a soap and air emulsion, severely restricting the flow through the filter media. As a result, there is excessive water back up in the filter so that a significant volume of incoming water passes to the drain.
2. The foam overflows the central filter chamber with the result that the foamed, untreated water migrates into the treated water in the bottom of the system, leading to contamination of the previously treated water.
3. Incoming water flowrates into the filter body can be relatively high (for example in excess of 0.4 l/s); this flow rate is sufficient to displace filter media within the media support screen.
4. Control of disinfectant dosing levels is inadequate.
5. The system includes a coarse strainer having an inlet strainer basket which is difficult to remove and replace.
6. Drainage of the high level storage tank would not work as envisaged owing to the requirement to have a minimum level of potable water available at all times should treated water not be available. The storage tank also requires separate supply and discharge pipes.

SUMMARY OF THE INVENTION

According to the present invention there is provided a water treatment device comprising a housing defining a filter chamber, and a filter body which contains a filter media and is disposed within the filter chamber, an annular passage being defined between a cylindrical side wall of the housing and the filter body, the housing having an inlet for water to be treated, disposed so as to create a circulating flow within the housing, a clean water outlet for treated water that has passed through the filter media, and an overflow outlet for overflow water, the device further comprising a spraying device connected to a source of an anti-foaming agent, the spraying device being situated above the filter media for spraying the anti-foaming agent in a direction towards the filter media.

The housing may be provided with a lid, which may engage the side wall. The spraying device may be supported on the lid.

The spraying device may be connected to a suitable source of the anti-foaming agent, or to a source of a liquid into which the anti-foaming agent is dispensed. For example, the source may provide treated water derived from the treated water outlet. Alternatively, the spraying device may be connected to a mains water supply. A dispenser for anti-foaming liquid may be provided to dispense the anti-foaming agent into the water supply (i.e. treated water or mains water) to the spraying device.

The overflow outlet may be an annular channel disposed above the filter media. The annular channel may be defined between the side wall and an inner wall of the annular channel which is spaced inwardly of the side wall. The inner wall may have an upper edge defining a weir over which water may overflow from the filter chamber into the annular channel.

The filter body may comprise a permeable wall which retains a granular filter media within the filter body, while permitting flow from the annular passage into the granular filter media. The inlet opening may open into the annular passage, and the permeable wall may be provided with a blocking element to prevent direct impingement of water flowing through the inlet on the granular media through the permeable wall.

Dispensing means may be provided for dispensing a water treatment agent into the filter chamber. The dispensing means may have a dispensing nozzle which is disposed to discharge the water treatment agent into the annular passage.

Another aspect of the present invention provides a water treatment system having a water treatment device as defined above.

DESCRIPTION OF THE DRAWINGS

For a better understanding of the present invention, and to show more clearly how it may be carried into effect, reference will now be made, by way of example, to the accompanying drawings, in which:

FIG. 5 shows a side view and a sectional view of a jet pump of the system of FIG. 1.

DETAILED DESCRIPTION

Figure 1:
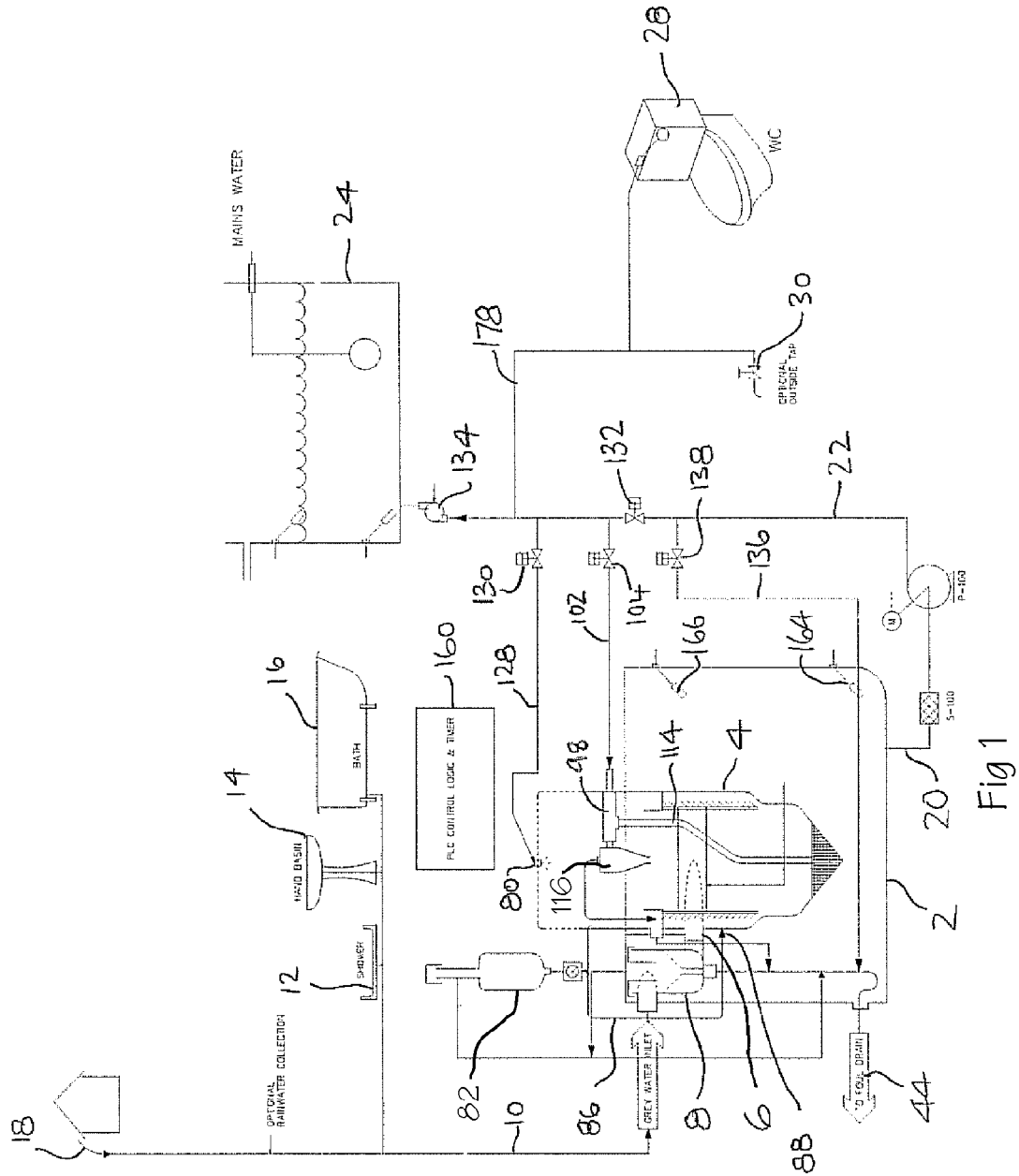
FIG. 1 is a schematic view of a water treatment system.

The system shown in FIG. 1 comprises a collecting tank 2 which accommodates a water treatment device 4. The water treatment device 4 has an inlet 6 which is connected, by way of a coarse strainer 8, to a grey water supply line 10. The grey water supply line 10 receives waste water from various household installations, represented in FIG. 1 by a shower 12, a hand basin 14 and a bath 16. Other water utilising equipment, such as a washing machine, may also be connected to supply the grey water line 10. Furthermore, the grey water line 10 may receive collected rain water, for example from a roof of the building in which the system is installed, as indicated at 18.

The collecting tank 2 receives treated water from the water treatment device 4, and has an outlet 20 which is connected by a line 22 to a treated water storage tank 24. The treated water can then be supplied from the tank 24 back through the line 22 for such purposes as flushing WCs 28 and urinals, or for agricultural or horticultural purposes, or vehicle washing, for example by means of an outside tap 30. Flow through the line 22 is controlled by a pump 21 and a valve 132.

Figure 2:
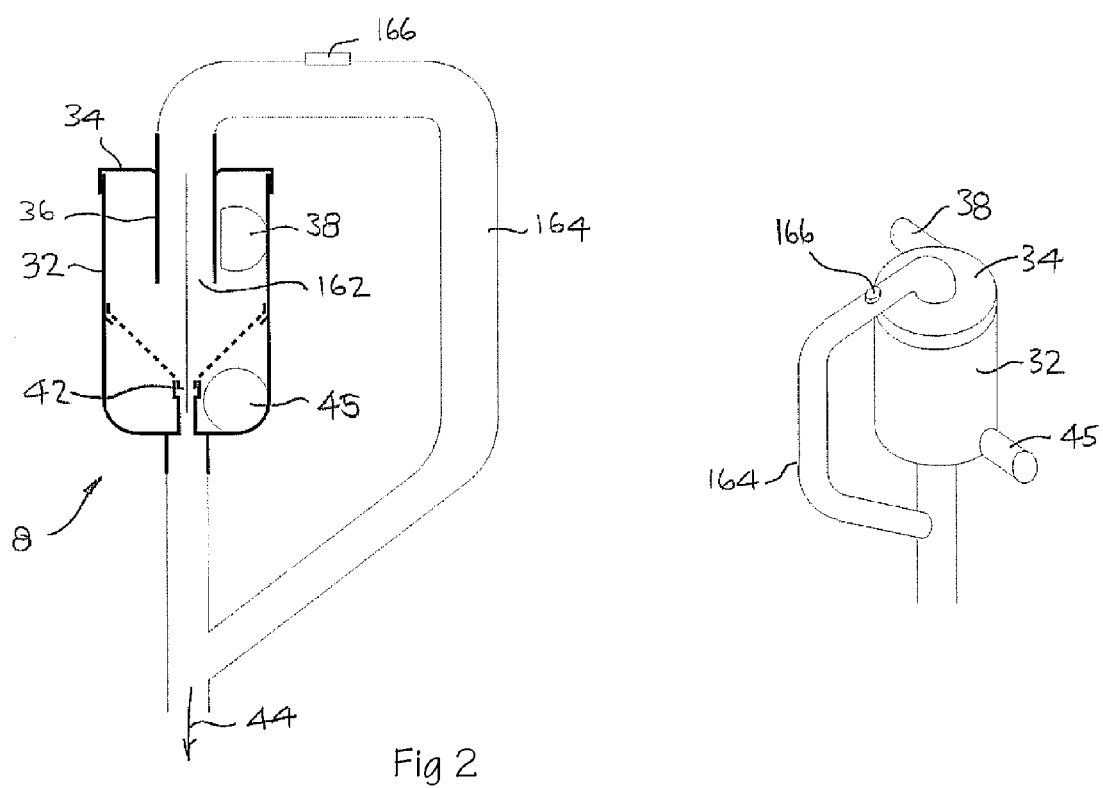
FIG. 2 shows various views of a coarse strainer of the system of FIG. 1.

The coarse strainer 8 is shown in greater detail in FIG. 2. It comprises a body 32 provided with a lid 34 having a core finder 36. A tangential inlet 38 is connected to the grey water line 10, so that the inflowing water is forced to swirl within the annulus between the body 32 and the core finder 36. A conical screen 40 separates the chamber within the body into a dirty side and a screened side. A discharge port 42 is provided at the lower region of the screen 40, and is connected to a drain 44 (FIG. 1) The core finder 36 is open at its lower end to provide an opening 162. At its upper end, the interior of the core finder 36 is connected by a pipe 164 to the outlet 42, and thence to the drain 44 (FIG. 1). A flow sensor 166 is provided at a high level in the pipe 164 and is connected to a control device 160. A tangential outlet 45 of the strainer 8 is connected to the inlet 6 of the water treatment device 4.

In operation, the swirling flow between the body 32 and the core finder 36 causes denser solids to migrate radially outwardly to the wall of the body 32. Lighter elements, including foam, are drawn inwardly to the lower pressure zone at the centre of the body 32. The screen 40 intercepts the denser solids and directs them, along with other suspended solids caught by the screen 40, to the discharge port 42 for discharge to the drain 44. Some foam entrained in the grey water is also caught by the screen 40 and discharged through the discharge port 42, although under most flow conditions the majority of the foam will exit through the core finder 36.

Water, from which the major suspended solid particles and some foam have been removed, passes through the screen 40 to the tangential outlet 45 and thence to the water treatment device 4.

The screen 40 is of conical form, and is provided with a handle (not shown) to enable easy removal or replacement, for example for cleaning purposes, once the lid 34 has been removed.

Should the screen 40 become blocked, for example by hair or other contaminants in the grey water flow in the line 10, the pipe 164 will act as a bypass, allowing the grey water flow to pass directly to the drain 44. In such circumstances, the sensor 166 will generate a signal which is passed to the control device 160 to generate an alarm signifying that the screen 40 must be removed for cleaning.

The pipe 164 may be made from a clear material, or incorporate a clear section, which enables flow in the pipe 164 to be checked visually.

The core strainer 8 avoids disadvantages which can arise from excessive foaming, which may be created as a result of a high soap content in the grey water, issuing, for example, from the shower 12 or the bath 16. Such foam can be discharged easily to the drain 44, so reducing the requirement for anti-foaming agent, which is generally undesirable for cost and ecological reasons.

The strainer 8 is configured to allow the majority of the incoming grey water to pass through the screen 40 to the tangential outlet 45, with only a minor proportion being discharged through the outlet 42. A small percentage of the incoming water carries the major proportion of large and heavy total suspended solids (TSS), and normally the majority of Biological Oxygen Demand (BOD) and Chemical Oxygen Demand (COD), reports to the discharge port 42, thus being removed before the media filtration stage in the water treatment device 4. This reduces dirt load on the media filter bed to reduce the filtration demand and media wash demand.

Figure 3:
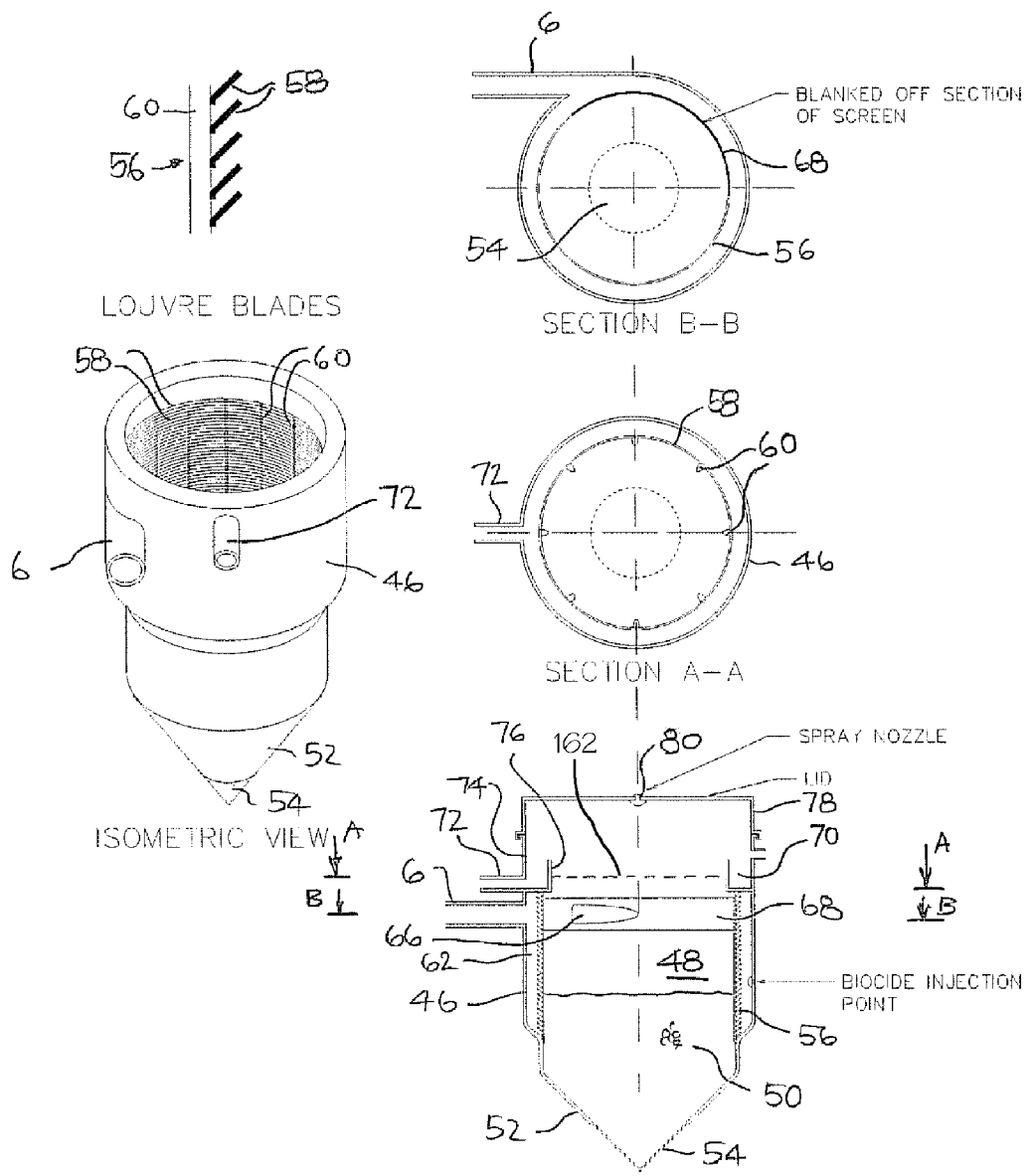
FIG. 3 shows various views of a water treatment device of the system of FIG. 1.

FIG. 3 shows the water treatment device 4. It comprises a filter body 46 defining a filter chamber 48, which accommodates a filter body 50 of a granular material such as spherical glass beads, ceramic sand, garnet, plastics, activated carbon or other suitable granular filter media. The filter body 46 has a conical base 52, terminating at an open mesh support screen 54. The filter media 50 is supported on the base 52 and the screen 54, and is also retained within a cylindrical support screen 56 which is constructed from annular louvres 58 extending around an array of upright stiffening support ribs 60.

At the upper region of the housing 46, there is an annular gap 62 between the support screen 56 and the side wall of the housing 46. The inlet 6 is tangential, and opens into the annular gap 62 at an inlet port 66. At the same vertical level as the inlet port 66, the support screen 56 is blanked off by a continuous blanking element 68 so that, in this region, no flow can take place across the support screen 56.

At the upper end of the filter housing 46, an annular channel, or launder, 70 is provided. The annular channel 70 has an outlet 72 which is connected to the drain 44. The channel 70 is defined between the upper edge region 74 of the wall of the housing 46 and an inwardly spaced inner wall 76.

A lid 78 is fitted over the filter housing 46, to engage the upper edge region 74. The lid 78 supports a spraying device in the form of a nozzle 80, which is directed to discharge spray downwards towards the filter media 50. As indicated in FIG. 1, a line 128, controlled by a valve 130 or by an orifice (not shown) is provided to convey treated water from the line 22 to the spraying device 80. A dosing mechanism 129 is provided for delivering an anti-foaming agent to treated water flowing in the line 128 to the spraying device 80.

As shown in FIG. 1, a container 82 is connected by a line 86 to dispense a water treatment agent into the waste treatment device 4 at a location within the annular gap 62. As represented schematically in FIG. 1, the agent from the container 82 is injected through a nozzle 88 which is disposed generally below the vertical level of the inlet port 66.

Figure 4:
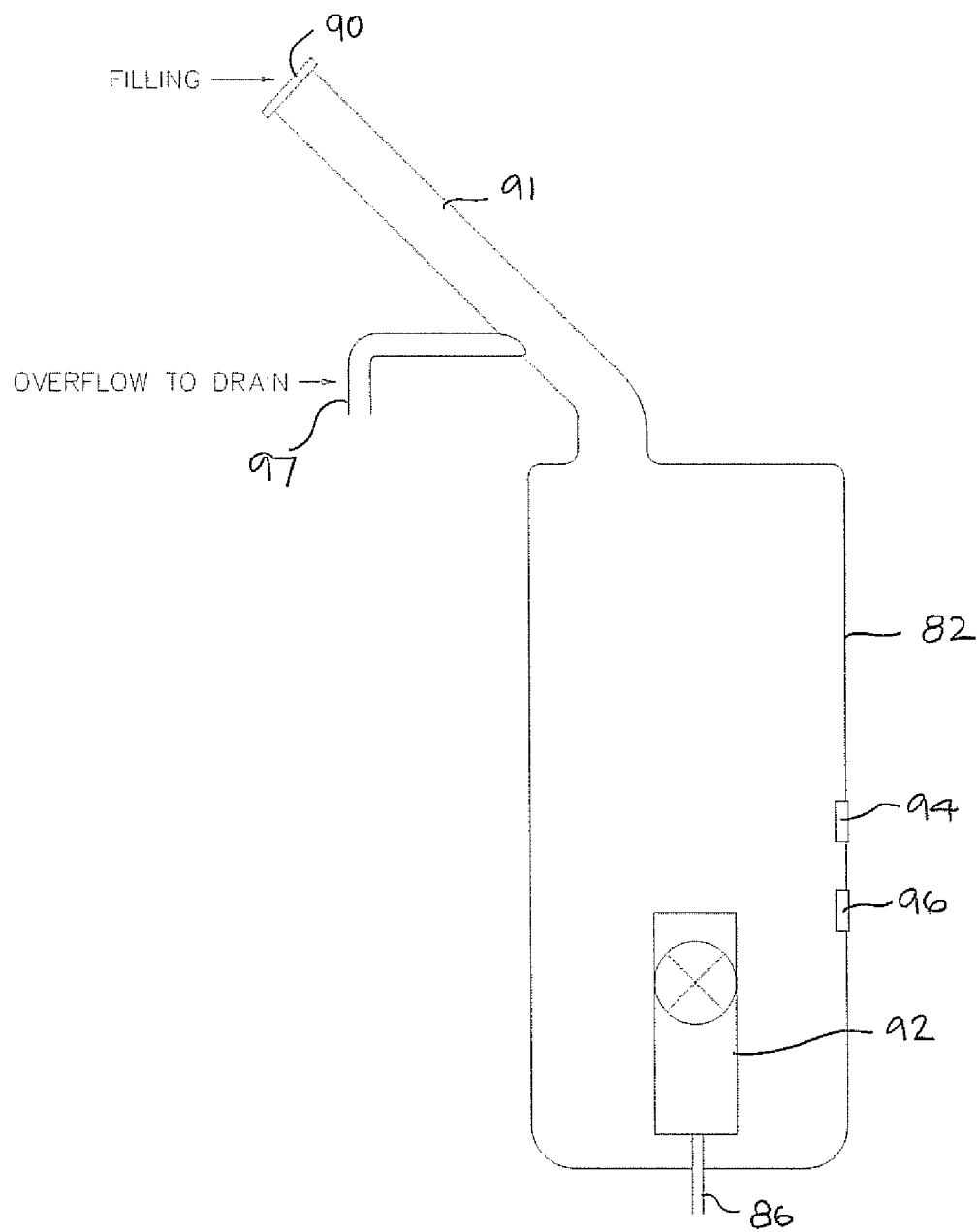
FIG. 4 is a schematic sectional view of a biocide dosing system of the system of FIG. 1.

The container 82 is shown in more detail in FIG. 4. It has a filling aperture 90 on an extended neck 91. The aperture 90 can be closed by, for example, a suitable screw cap (not shown). An overflow 97 is provided on the neck 91, and is connected to the drain 44 for the discharge of an excess agent entering the container 82. The container 82 accommodates a dosing pump 92, which has an outlet connected to the line 86. The container is also provided with two level switches, 94, 96. The upper level switch 94 provides an initial warning that the treatment agent needs to be replenished, and is set at a level at which the empty volume in the container 82 is at least equal to a pre-packaged volume in which the water treatment agent is supplied. Consequently, the entire contents of the pre-packaging container can be poured into the container 82, avoiding the need to store part-used containers of the agent.

The lower level sensor 96 is set at a level corresponding to imminent total emptying of the container 82, so that no treatment agent is available for dispensing to the water treatment device 4. If the level of the treatment agent falls below the level sensor 96, the valve 132 is closed to terminate the supply of treated water to the storage tank 24. Any remaining water in the treatment device 4 or the collecting tank 2, and any further incoming grey water will be pumped by the pump 21 via the valve 138 and the line 136 to the drain 44 either directly as shown in FIG. 1 or via the annular channel 70.

Any suitable water treatment agent may be used. For example, a chlorine-based disinfectant is suitable. The water treatment agent may be formulated in any one of the following ways:

an anti-foaming agent may be present, which is mixed into the disinfectant so as to be stable and dispersed;

a coloured biological fluid to OECD/ISO/EN standard may be present, in order to identify treated grey water so that it can be distinguished at the point of use from wholesome water;

the formulation is preferably readily biodegradable according to OECD301 TEST, in order to avoid adverse effects when the treated water is eventually disposed of through the drain 44;

the formulation is preferably not a skin or eye irritant, and consequently is in accordance with OECD404/405;

the formulation may include an odour control additive to avoid unpleasant smells;

the formulation may include an additive to avoid gas build-up;

the formulation may include an additive to protect and lubricate moving parts, such as the pump 92 and other pumps, level control switches and valves of the system;

the formulation may include microorganisms to assist the biological breakdown of waste from the WC 28 or other appliances utilising the treated water.

Consequently, a pre-treatment of such waste can occur within the drain 44 and downstream sewer, and other parts of the underground drainage system, so that the final municipal water treatment plant can operate more efficiently at a reduced biological load.

Thus, the treatment agent formulation can be such as to reduce the risk of gas build-up within the system, and ensures that the water treatment system and the water tank 24 are kept clean and free from microorganisms. The odour control additive may be scented, and the scent and any colour added to the treated water ensures that the user is aware that the water is treated grey water to be used only for flushing WCs or urinals, or for agricultural or horticultural purposes.

FIG. 5 shows a jet pump 98. The jet pump 98 has an inlet 100 which is connected by a line 102 to the line 22 between the pump 21 and the storage tank 24, under the control of a valve 104.

The jet pump 98 comprises a nozzle 106 and a venturi 108, leading to an outlet 110. A suction inlet 112 is connected by a pipe 114 which extends into the screen 54 at the bottom of the water treatment device 4. The pipe 114 thus extends into the granular media 50.

Figure 6:
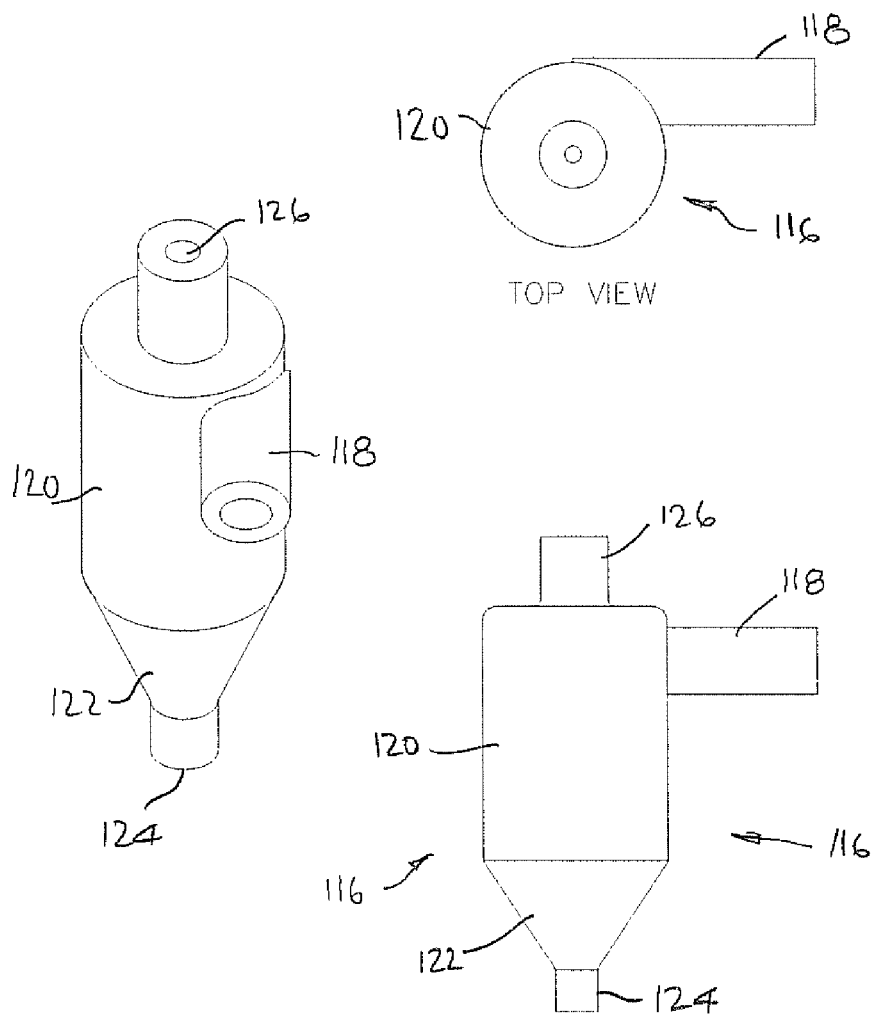
FIG. 6 shows various views of a cyclonic filter media cleaner of the system of FIG. 1.

The outlet 110 of the jet pump 98 is connected to the inlet 118 of a cyclone 116. The cyclone 116 is shown in more detail in FIG. 6, from which it can be seen that the inlet 118 is directed tangentially into a cylindrical body 120 of the cyclone 116. The inlet 118 is situated at the upper end of the cylindrical body 120 (in the orientation shown in FIG. 1), and a frustoconical section 122 extends downwardly from the cylindrical body 120. At the lower end of the frustoconical section 122, there is an underflow outlet 124, while an overflow outlet 126 is provided at the upper end of the cylindrical body 120.

The cyclone 116 is disposed so that the underflow discharges into the filter chamber 48 above the bed of granular media 50, while the overflow outlet 126 is connected to discharge into the annular channel 70, from which the overflow is conveyed through the outlet 72 to the drain 44.

It will be appreciated that the jet pump 98 and the cyclone 116 are situated within the water treatment device 4, and so are enclosed within the lid 78.

The line 22 includes an ultraviolet light source 134 for sterilising (at least partially) water passing from the collecting tank 2 to the storage tank 24.

Figure 8:
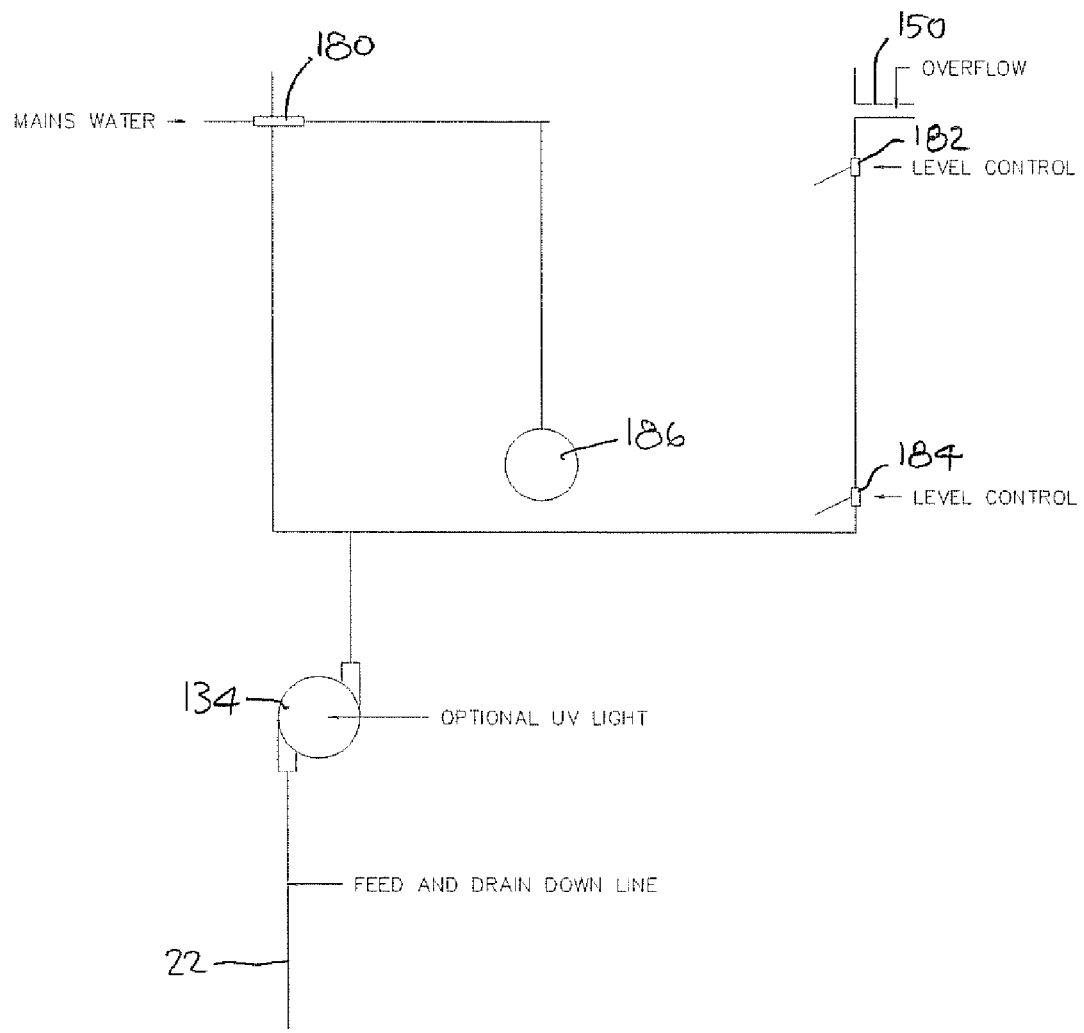
FIG. 8 is a schematic sectional view of a treated water storage tank of the system of FIG. 1.

The storage tank 24, as shown in FIG. 8, may be a conventional cold water tank provided with a standard ball cock 180 operated by a float 186, which controls the supply of mains water to the tank 24. The float 186 of the ball cock 180 is positioned at a low level in the tank 24. Consequently, if the treated grey water in the tank 24 reaches a low level, the ball cock 180 will open and mains water will be supplied to replenish the tank 24 to a level sufficient to meet normal demands from the WCs 28. For example, the ball cock may be closed when the tank 24 contains 20 liters or more. The tank 24 is also provided with upper and lower level switches 182, 184.

An overflow 150 is provided for discharging excess water 24 from the tank to an overflow line 152 and thence to the drain 44.

Figure 7:
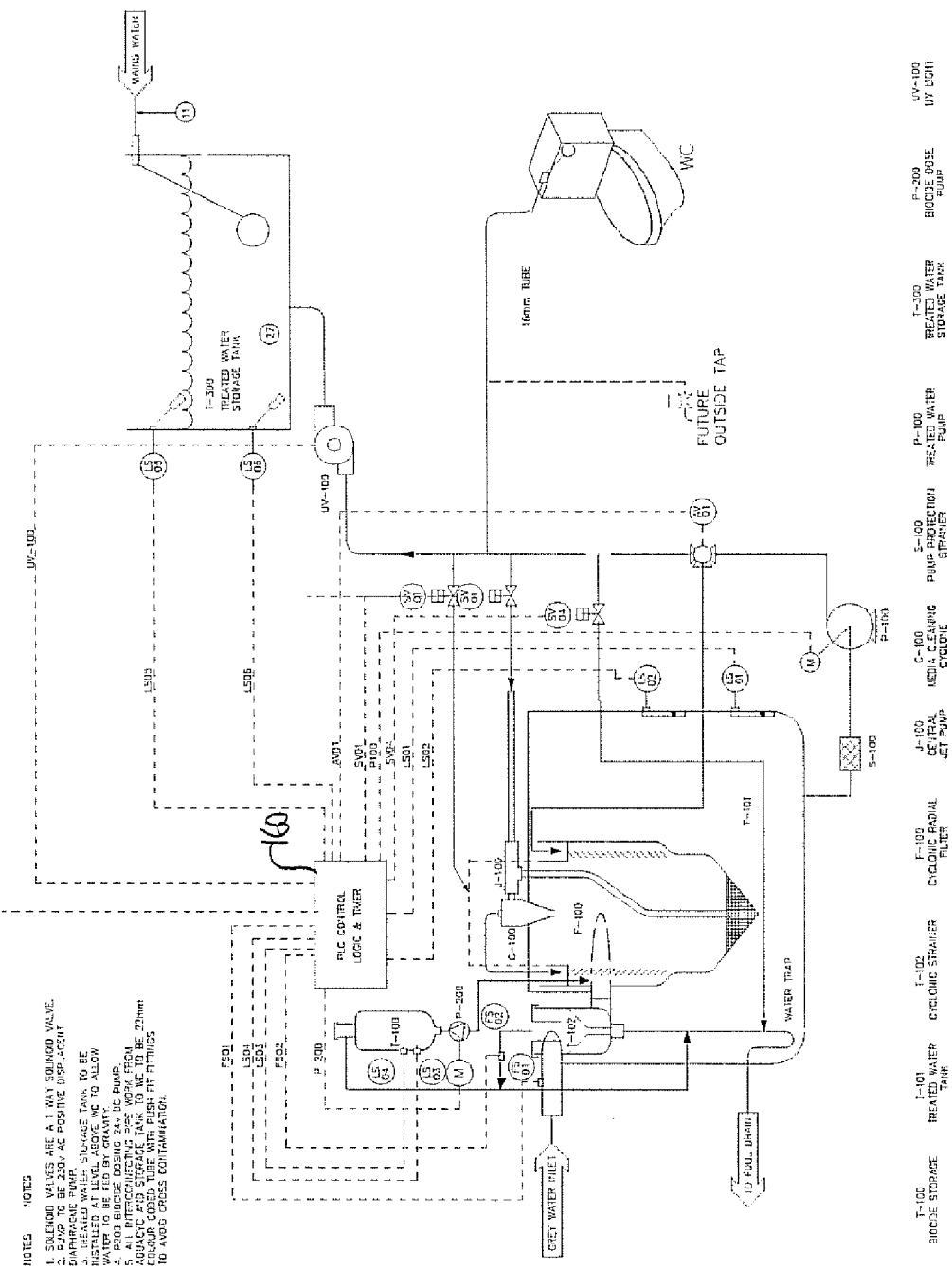
FIG. 7 corresponds to FIG. 1 but represents control connections for the components of the system.

The various components of the system are controlled from the control device 160 (FIGS. 1 and 7) which is connected, as indicated by dotted lines, to the individual components so as to receive signals from the various sensing devices, and to provide operating signals to the various pumps and valves.

In operation, grey water from the various sources 12, 14, 16, 18 is supplied to the inlet 38 of the coarse strainer 8. As described above, the tangential inlet 38 causes a circulating motion within the coarse strainer 8 so that heavy particles migrate radially outwardly, and then down the conical screen 40 to be discharged through the outlet 42 to the drain 44. Primary screened water passes through the screen 40 and exits though the tangential outlet 45, to enter the water treatment device 4 through the tangential inlet 64. The water enters the annular gap 62 between the body 46 and the retaining screen 56, where it generates a circulating flow. The blocking element 68 prevents any forceful flow of incoming water from passing at high velocity directly into the interior of the retaining screen 56, in such a manner that it would disturb the granular filter media 50. However, away from the horizontal level of the inlet 64, the water can penetrate between the louvres 58, so that some will enter the retaining screen 56 above the filter media 50 and percolate downwards through the filter media 50, while some will pass through the retaining screen 56 in its lower region, and so enter the filter media 50 in a radial direction. A typical water level within the water treatment device 4 is shown at 162, and so it will be appreciated that, in normal operation, there will usually be a substantial body of water above the top of the filter media 50.

As the water flows through the filter media 50, impurities will be trapped by the particles of the filter media, so that the water eventually emerging into the collecting tank 2 through the screen 54 at the bottom of the body 48 is relatively clean.

A level sensor 164 provides a signal to the control device 160 to indicate that treated water is present in the collecting tank 2. This causes operation of the pump 21 and the treated water is pumped to the storage tank 24, through the ultraviolet steriliser 134, until the level in the collecting tank 2 falls below the activation level of the switch 164, which is then deactivated. The flow rate of the pump 21 is closely matched to the flow rate into the collecting tank 2, for example by means of a signal from the control device 160 in response to the output of a suitably positioned flowmeter (not shown).

A treatment agent is dosed by the pump 92 from the container 82 into the annular channel 62 at regular intervals, controlled by the control device 160.

After a predetermined period of operation, established within the control device 160, a cleaning cycle is performed on the water treatment device 4. The valve 132 is closed, to terminate the supply of treated water to the storage tank 24, and the pump 21 is stopped. Water rises in the collecting tank 2 until an upper level sensor 166 is actuated, signifying that the collecting tank is full. The valve 104 is then opened from its normally closed condition, and the pump 21 is started to supply the treated water through the line 102 to the jet pump 98. The jet pump 98 operates in a conventional manner to generate a low pressure between the nozzle 106 and the venturi 108 to create a suction in the pipe 114, drawing the granular filter media 50 upwards through the pipe 114 to be discharged, with the treated water flow through the jet pump 98, from the outlet 110. A conical section at the inlet of the pipe 114 avoids rat holing of the filter media 50 during the cleaning cycle. The filter media is introduced into the cyclone 116 along with some water from the collecting tank 2 drawn through the screen 54. This causes flushing of the screen 54. The significant turbulence experienced in the cyclone 116 agitates the filter media 50, causing a scrubbing action which removes dirt and contaminants from the media 50. The contaminants are carried away in the overflow through the overflow outlet 126 to the drain 44, while the cleaned filter media is discharged back into the water treatment device 4 through the underflow outlet 124. This process continues for a predetermined time after which the bed of filter media 50 in the water treatment device 4 is substantially clear of dirt and contaminants, and can resume effective filtering of the incoming grey water.

During normal operation of the system, the valve 130 can be opened, either continuously or intermittently, to supply a relatively small proportion of the treated water from the line 22 to the spraying device 80. The spray is directed at any foam accumulating above the water in the water treatment device 4, so as to collapse the foam, or to cause it to pass to the annular channel 70 to be carried to the drain 44. The dosing mechanism 129 is similar to the disinfectant dosing mechanism described with reference to FIG. 4, and serves to add an anti-foaming agent to the flow of treated water in the line 128.

In the event of high flow through the grey water line 10 greater than the flow capacity of the filter media 50, the level in the water treatment device 4 may rise above the level 162. In such circumstances, the excess water will overflow over the inner wall 76 into the channel 70, and be conveyed to the drain 44, so avoiding untreated water entering the collecting tank 2.

In normal operation, the valve 132 is open and the valve 138 is closed. The pump 21 supplies treated water through the line 22, past the UV light 134, to the tank 24.

Cisterns of WCs 28, and other water users such as the tap 30, are supplied from the line 22 through a branch line 178. Consequently, if there is a call for replenishment of a WC cistern 28 when the tank 24 is full and the pump 21 is therefore not operating, replenishment will take place from the tank 24 through the line 178. Alternatively, if the treated grey water in the tank 24 is at a relatively low level, and the pump 21 is running to replenish it, replenishment of the WC cistern 28 will take place directly from the collecting tank 2.

It is undesirable for treated water to remain unused in the storage tank 24 for extended periods. Consequently, the control device 160 is programmed so that, at predetermined intervals, for example every five to ten days, it provides a "dump" signal which terminates operation of the pump, opens the valve 132 (if closed) and opens the valve 138. Water from the tank 24 will then be discharged through the lines 22 and 136 and thence to the drain 44, either directly as shown in FIG. 1 or via the annular channel 70 of the treatment device 4 (FIG. 3). When discharge of the treated grey water in the tank 24 is almost complete, the ball cock 180 will open, and a flow of mains water will take place through the lines 22 and 136 to flush these lines of treated grey water.

The level switch 184 provides a signal to the control device 160 when the level in the tank 24 is at a low level. The control device 160 then holds the valves 132 and 136 open for a predetermined time to allow the flushing process to continue. The valves 132 and 136 are then closed and mains water enters the tank to the level set by the float 186 until grey water is available.

If the level in the tank 24 rises significantly to actuate the switch 182, a signal is transmitted to the control device 160, which closes the valve 132 and opens the valve 138. The water in the collecting tank 2 will thus be directed to the drain 44, either directly as shown in FIG. 1, or via the channel 70.

The system described above can be configured to achieve recycling of a substantial proportion of the mains water utilised in a domestic environment. The system is simple to construct, and has a lower part count than the systems disclosed, for example, in WO9416157 and CN101352629. Many of the components can be manufactured easily from plastics materials, for example by moulding processes, and consequently can be constructed at low cost. The system is economical to run, and is consequently easy to install and operate.

The various valves 104, 130, 132, 138 may be solenoid operated valves controlled from the control device 160, which may be a programmable logic controller including a timer. One or more water flow sensors may be provided in the system, for example to monitor the flow rate of grey water along the line 10, the flow rate along the line 22 to the storage tank 24, or the outflow of treated water to the WC 28 or other appliances along the line 26.

It will be appreciated that the circulating flow generated in the coarse strainer 28 has a braking effect on the incoming flow, restricting the maximum flow rate into the water treatment device 4. Consequently, excessive agitation of the granular filter media 50, which might dislodge collected impurities and allow them to be passed through to the collecting tank 2, is avoided. A similar effect is achieved by means of the blocking element 68, which avoids strong turbulent flow from the inlet port 66 from entering the retaining screen 56.

Because the flow into the filter media 50 takes place both downwardly through the open surface of the filter media 50 and radially through the retaining screen 56, the open filtration area is significantly larger than in a conventional downflow or up-flow filter of the same diameter. Consequently, the flux rate (ie volumetric flow rate per unit area) into the filter media 50 is relatively large, resulting in a reduction of the Reynolds number.

Although various materials may be used for the filter media 50, spherical glass beads have the advantage that their shape reduces attrition of the beads during the cleaning cycle utilising the cyclone 116, so prolonging the life of the filter media before it requires replacement. The smoothness of the glass beads also allows easier removal of contaminants during the cleaning cycle.

A particular advantage of the water treatment device 4 as described above is that the lid 78 contains any foam that may be generated as a consequence of the presence of soap and similar materials in the grey water entering the system. By introducing treated water, possibly with an added anti-foaming agent, through the spraying device 82 any foam that is generated can be collapsed so that the water content can pass through the filter media 50, or so that the foam can be discharged through the annular channel 70.

The cyclone 116 can be configured to provide a precise cut between the underflow and the overflow, so that substantially all of the granular filter media is discharged through the underflow outlet 124, with substantially none of the filter media being discharged through the overflow outlet 126 to the drain 44.

Although the system is described as including a disinfectant container 82 for supplying disinfectant through the nozzle 88 into the annular gap 62, other methods of disinfection can be used, such as the UV steriliser 134, ultrasonic radiation, electro-coagulation or silver-based disinfection.

The storage tank 24 is preferably situated at a high level in the associated building, so that flow to the WC 28 and other appliances, including the outside tap 30, can take place under gravity. Alternatively, an on demand pump can be provided to distribute the treated water.

It will be appreciated that the coarse strainer 8 and the cleaning cycle utilising the cyclone 116 cause substantially all of the particulate material and bio-matter in the incoming grey water to be removed from the flow and discharged to the drain 44, so that the treated water reaching the storage tank 24 is substantially free of any such particulates or bio-matter.

The filter media 50 may be selected or modified so as to provide required electrical properties to assist in the trapping of particulates in the flow, in order to enhance filtration efficiency.

Although the invention has been described with reference to the treatment of grey water from domestic appliances, it could also be employed as a final treatment for mains water, for example if there is a suspicion that the quality of the mains water is inadequate, for example as a result of a corroded or aged distribution network.

As mentioned above, the treated water reaching the storage tank 24 may be rendered identifiable as treated grey water by the addition of suitable colouring and/or scent. In addition, the pipework sections of the system may be identified by suitable colour coding or coloured taping to indicate that water carried in that pipework is to be used only for appropriate purposes, such as WC flushing or agricultural or horticultural distribution.

It will be appreciated that various modifications may be made to the system as described above, without falling outside the scope of the present invention. For example, if foam generation is likely to be low, the core finder 36 of the coarse strainer 8 may be closed, and the pipe 164 dispensed with. Any foam is therefore removed through the discharge port 42.

Figure 9:
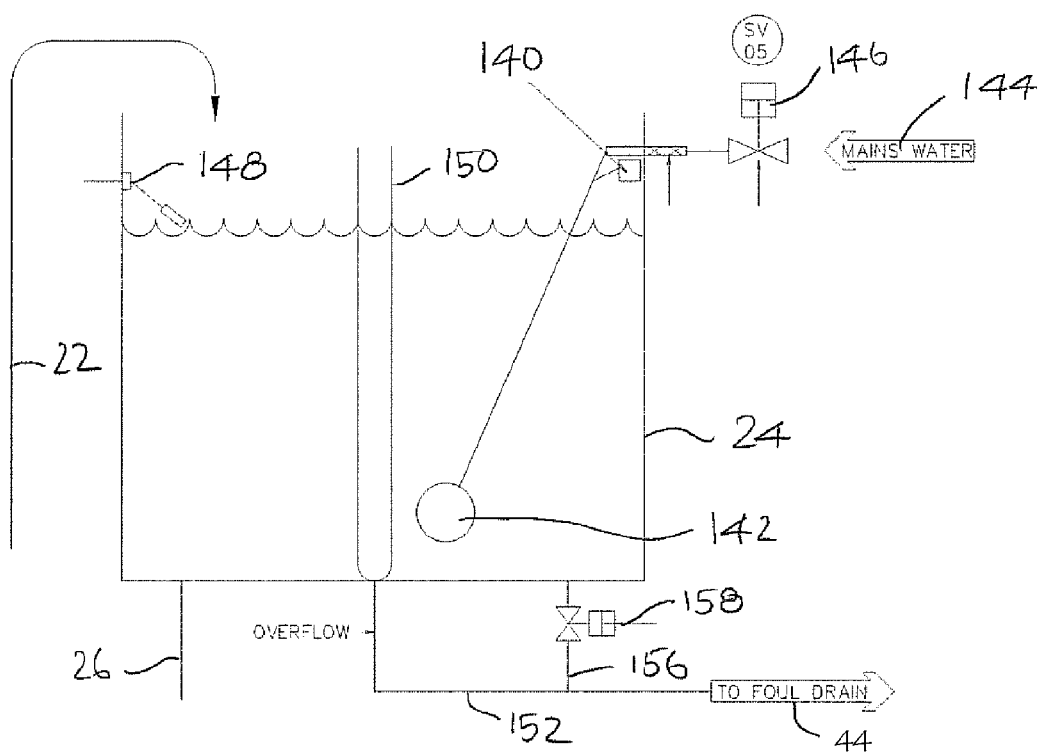
FIGS. 9 to 12 correspond to FIG. 8 but show four variants of the treated water storage tank.
Figure 10:
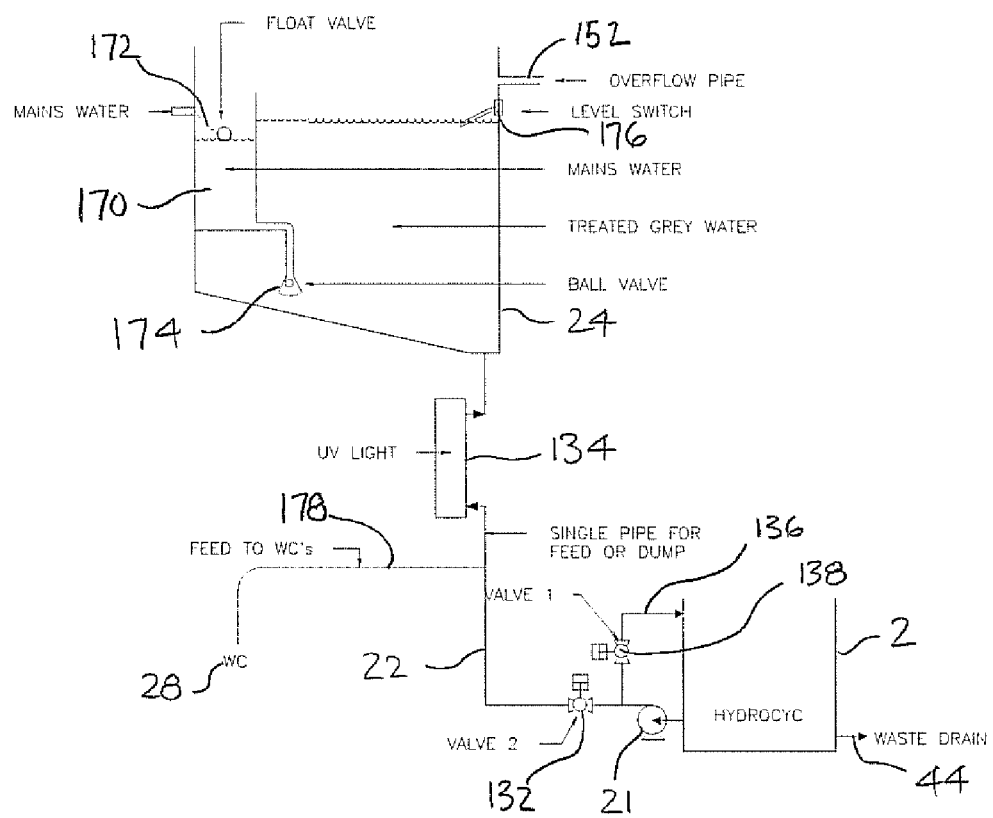
Figure 11:
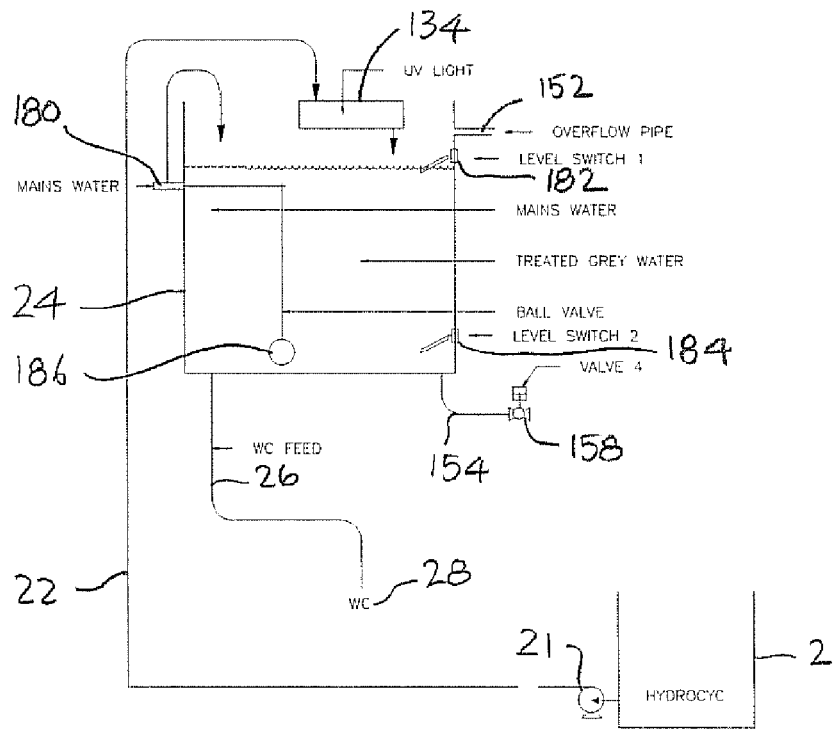

Possible variants of the treated water storage tank 24 are shown in FIGS. 9 to 11. Features in common with the storage tank shown in FIGS. 1 and 8 are designated by the same reference numbers.

In the modified arrangement of the tank 24 shown in FIG. 9, the tank is provided with a liquid level switch 140, operated by a float 142, that is responsive to the level of treated water in the storage tank 24. The switch 140 is configured to provide a low level signal when the level of treated water in the tank 24 is close to the bottom of the tank, i.e. when the tank 24 is almost empty. A mains water supply 144 is connected to the tank 24, and controlled by a valve 146.

The tank 24 is also provided with a high level switch 148, which provides a "full" signal when the level of treated water in the tank 24 is towards the top of the tank.

The storage tank 24 receives the treated water from the collecting tank 2 through the line 22, but a separate outlet line 26 supplies the WC 28, the outside tap 30 and any other installations for utilising the treated water. If the water in the storage tank 24 is not replenished sufficiently, the level will fall and eventually the switch 140 operated by the float 142 will be actuated to send a signal to the control device 160. This will cause the valve 146 to be opened to permit mains water 144 to enter the storage tank 24 so that there is a continued supply of water to the WC 28 and the tap 30. If the water level in the storage tank 24 rises to a level at which the sensor 148 is actuated, a signal is transmitted to the control device 160, which closes the valve 132 and opens the valve 138. The water in the collecting tank 2 will thus be directed to the drain 44. In the event of a failure in the system which causes continued flow of water into the storage tank 24, either from the main supply 144 or through the line 22, water will overflow into the overflow device 150 and thence to the drain 154.

When a "dump" signal is generated by the control device 160, a valve 158 is opened to allow all of the water in the storage tank 24 to be discharged to the drain 44 through a line 156. After the tank 24 has been drained, a signal is sent to the valve 146 so that it is opened to allow mains water to replenish the tank 24. The valve 146 is provided to shut off the supply of mains water to the tank 24 despite the float 142 being at a low level, in order to suspend re-filling of the tank 24 during the dumping operation.

In the variant shown in FIG. 10, the storage tank 24 accommodates a mains water chamber 170 provided with a conventional float-operated ball cock 172. The mains water chamber 170 communicates with the main interior of the tank 24 through a ball valve 174 situated towards the bottom of the tank 24. A level switch 176 is situated towards the top of the tank 24, and is responsive to the level of water in the main interior of the tank 24. While treated grey water is present in the tank 24, the ball valve 174 is closed, and the mains water chamber 170 is filled through the ball cock 172. When the level in the mains water chamber 170 reaches an upper level, the ball cock 172 closes.

If there is a call for replenishment of a WC cistern 28 when no grey water is available in the collecting tank 2, and the level of treated grey water in the tank 24 is insufficient to supply the cistern 28, the ball valve 174 will open, and mains water will flow from the mains water chamber 170 into the main interior of the tank 24 and thence through the lines 22 and 178 to the WC cistern 28.

FIG. 11 shows a further modification of the connections to the tank 24. In this variant, the tank 24 is generally similar to that of FIG. 9.

Thus the treated grey water supply line 22 and the WC feed line 26 are separate. However, in the embodiment of FIG. 11, the tank 24 is provided with a separate drain down line 154, controlled by a valve 158.

When a "dump" signal is sent by the control device 160 the discharge valve 158 is opened, and, as in the embodiment of FIG. 9, the treated grey water in the tank 24 is discharged to the drain 44. The valve 158 remains open for a sufficient time to cause the water level in the tank 24 to drop below the level at which the float 186 falls to open the ball cock 180. Mains water then enters the tank 24 to flush out any remaining grey water. Finally, the valve 158 is closed, and the ball cock 180 continues the supply of mains water until the predetermined minimum level (eg 20 liters) of water has been admitted to the tank 24.

Figure 12:
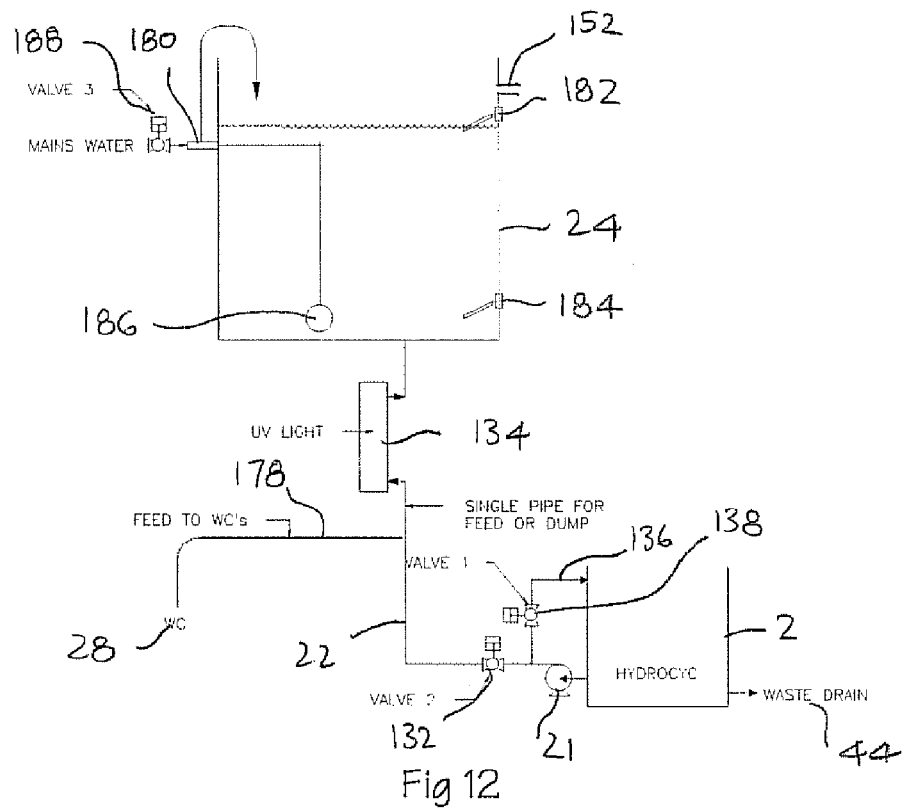

The variant shown in FIG. 12 has the same circuit as the embodiment of FIGS. 1 and 8 for supplying treated grey water to the tank 24 and the WC cisterns 28, and for dumping water to the drain at predetermined intervals. However, in the embodiment of FIG. 12, a powered valve 188, for example a solenoid-operated valve, is provided upstream of the ball cock 180. The valve 188 is controlled by the control device 160.

When a "dump" signal is generated by the control device 160, the pump 21 is stopped, and the valves 132 and 138 are opened, as in the embodiment of FIGS. 1 and 8. When the level of water in the tank 24 is at a sufficiently low level to cause the ball cock 180 to open, mains water is introduced into the tank 24 to flush the tank and the downstream pipework. If necessary, a signal can be provided to the valve 188 to close it, so terminating the supply of mains water to the tank 24, allowing it to be drained completely.

The invention claimed is:

1. A water treatment device comprising:
   a housing having a cylindrical side wall and defining a filter chamber,
   a filter body comprising a permeable wall which contains a granular filter media and is disposed within the filter chamber,
   an annular passage defined between the cylindrical side wall of the housing and the filter body, the permeable wall permitting flow from the annular passage into the granular filter media
   an inlet in the housing for water to be treated, the inlet opening into the annular passage and being disposed so as to create a circulating flow within the housing,
   a clean water outlet for treated water that has passed through the filter media,
   an overflow outlet for overflow water,
   a source of an anti-foaming agent,
   a spraying device connected to the source of an anti-foaming agent, the spraying device being situated above the filter media for spraying the anti-foaming agent in a direction towards the filter media, wherein
   the permeable wall is provided with a blocking element preventing flow through the permeable wall at the region of the permeable wall adjacent the inlet.

2. A water treatment device as claimed in claim 1, in which the filter housing is provided with a lid engaging the side wall.

3. A water treatment device as claimed in claim 2, in which the spraying device is supported on the lid.

4. A water treatment device as claimed in claim 1, in which the spraying device is connected to receive treated water derived from the treated water outlet, a dispenser for anti-foaming agent being provided for delivering the anti-foaming agent to the treated water supplied to the spraying device.

5. A water treatment device as claimed in claim 2, in which the spraying device is connected to receive mains water, a dispenser for anti-foaming agent being provided for delivering the anti-foaming agent to the mains water supplied to the spraying device.

6. A water treatment device as claimed in claim 1, in which the overflow outlet is an annular channel disposed above the filter media.

7. A water treatment device as claimed in claim 1, in which the annular channel is defined between the side wall and an inner wall of the annular channel.

8. A water treatment device as claimed in claim 7, in which the inner wall has an upper edge providing a weir for the overflow of water from the filter chamber into the annular channel.

9. A water treatment device as claimed in claim 1, in which a dispensing means for a water treatment agent is provided, the dispensing means comprising a dispensing nozzle disposed to discharge the water treatment agent into the annular passage.

10. A water treatment system comprising a source of water to be treated and a water treatment device, the water treatment device comprising:

a housing having a cylindrical side wall and defining a filter chamber, a filter body comprising a permeable wall which contains a granular filter media and is disposed within the filter chamber, an annular passage defined between the cylindrical side wall of the housing and the filter body, the permeable wall permitting flow from the annular passage into the granular filter media an inlet in the housing for water to be treated, the inlet opening into the annular passage and being disposed so as to create a circulating flow within the housing, a clean water outlet for treated water that has passed through the filter media, an overflow outlet for overflow water, a source of an anti-foaming agent, a spraying device connected to the source of an anti-foaming agent, the spraying device being situated above the filter media for spraying the anti-foaming agent in a direction towards the filter media, wherein the permeable wall is provided with a blocking element preventing flow through the permeable wall at the region of the permeable wall adjacent the inlet.

11. A water treatment system as claimed in claim 10, in which a strainer is provided at the inlet of the water treatment device.

12. A water treatment system as claimed in claim 11, in which the strainer comprises a chamber divided by a screen into a dirty side and a screened side, the screen being provided with a discharge port exposed to the dirty side and communicating with a drain, the dirty side of the chamber having a hollow core finder which is open to the chamber and is connected to the drain so as to bypass the discharge port.

13. A water treatment system as claimed in claim 10, in which the clean water outer of the water treatment device discharges into a collecting tank which is connected to supply a treated water storage tank, a control device being provided for causing the contents of the water storage tank to be discharged to the drain at predetermined intervals.

\* \* \* \* \*